United States Patent

Greeley

[15] 3,641,839

[45] Feb. 15, 1972

[54] VISCOUS TORSIONAL VIBRATION DAMPERS

[72] Inventor: Anthony P. Greeley, Elma, N.Y.

[73] Assignee: Houdaille Industries, Inc., Buffalo, N.Y.

[22] Filed: Feb. 5, 1970

[21] Appl. No.: 8,843

[52] U.S. Cl. .................................................. 74/574, 188/1 B
[51] Int. Cl. .................................................. F16f 15/10
[58] Field of Search .................................. 74/574; 188/1 B

[56] References Cited

UNITED STATES PATENTS 3,234,817   2/1966   Williamson .............................. 74/574

FOREIGN PATENTS OR APPLICATIONS 736,808   9/1955   Great Britain ........................... 74/574

*Primary Examiner*—William F. O'Dea
*Assistant Examiner*—F. D. Shoemaker
*Attorney*—Hill, Sherman, Meroni, Gross & Simpson

[57] ABSTRACT

Viscous damping fluid is filled into a working chamber of a damper through a filling opening in the damper housing and conveyed to a reservoir through a passage in a relatively rotatable annular member mounted within the working chamber and the fluid then transferred from the reservoir to shear film spaces between working surfaces in parallel shear film spaced relation.

10 Claims, 8 Drawing Figures

PATENTED FEB 15 1972 3,641,839
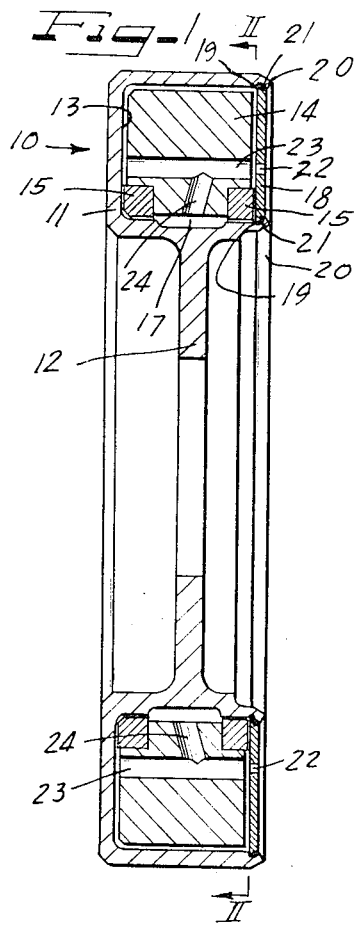
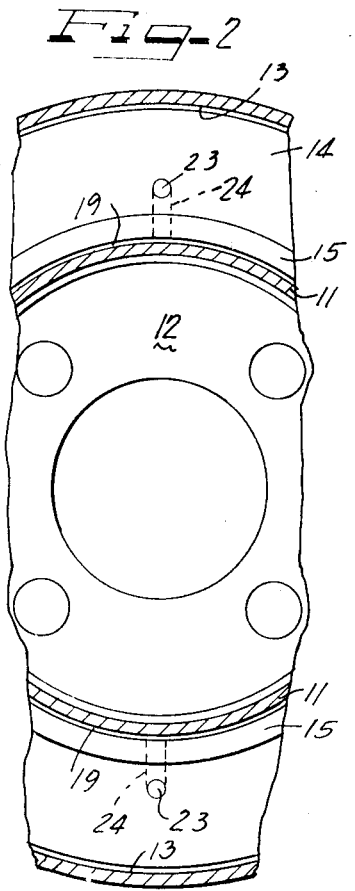
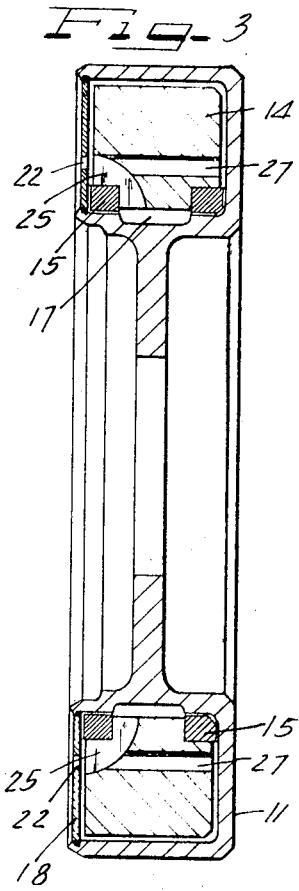
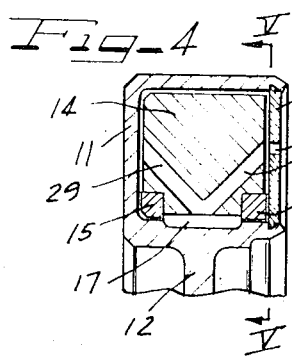
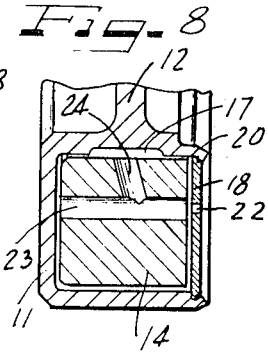
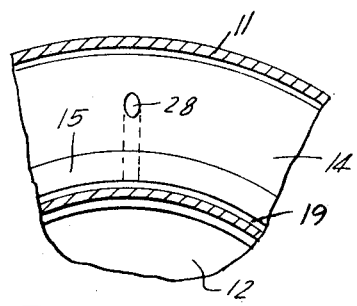
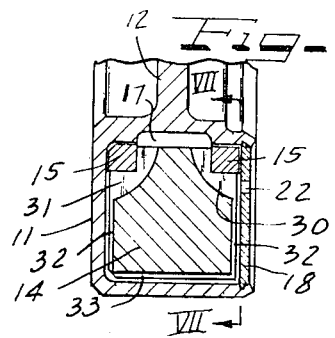
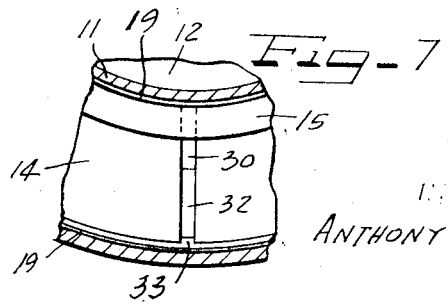
INVENTOR
ANTHONY P. GREELEY 3,641,839

VISCOUS TORSIONAL VIBRATION DAMPERS

This invention relates to the art of viscous torsional vibration dampers, and is more particularly concerned with filling such dampers with viscous damping medium of relatively heavy viscosity.

Viscous torsional vibration dampers employ a viscous damping medium between parallel working surfaces in shear film spaced relation having regard to the viscosity of the fluid. Commonly silicone oils are used because of their advantageous stability throughout wide temperature ranges. Such viscous damping medium of a viscosity rating of less than 60,000 centistokes has not presented any particular problem in filling the same into the sealed working chambers of the dampers through filling openings, generally provided therefor in the covers of the dampers and which filling openings are then sealed after filling has been accomplished.

Heavier viscosity silicone fluids are becoming commercially available at more reasonable cost, and such high-viscosity fluids have considerable advantage over the lighter viscosity fluids in numerous applications of the dampers in practice. However difficulties have been encountered in filling the damper units adequately using the heavier viscous damping fluids, requiring higher pumping pressures and longer filling time. Danger of damage to the damper performance may result from the higher pumping pressures unless extreme care is exercised. High pumping pressures required to load the dampers with fluid of 60,000 centistokes and higher may build up localized forces which may rupture the cover seals and distort the cover by generating excessive axial force against the cover through which the filling openings are generally provided. Distortion of the outer diameter of the housing due to radial forces may also result. These distortions result in an increase in design gap sizes which in turn, results in a damper which does not perform as intended. If the pumping pressure is lowered to avoid the danger just mentioned, the filling time cycle is lengthened and becomes uneconomical, not lending itself to production line operation. Air may be trapped in any of the working gaps or shear film spaces and which cannot be readily extracted, thus resulting in erratic test results by varying the working area which produces damping. Further, the clearances at the bearing surfaces, both radial and axial in such dampers are necessarily extremely close such as on the order of 0.002 inch to 0.010 inch and severely restrict flow of the viscous fluid to the reservoir in the damper even though flow paths of limited area are provided in the bearing surfaces.

According to the present invention, the foregoing and other disadvantages, shortcomings, inefficiencies and problems are overcome by providing a new and improved means for filling viscous torsional vibration dampers.

An important object of the invention is to provide novel means for filling viscous torsional vibration dampers.

Still another object of the invention is to provide for the easy, rapid and efficient filling of viscous torsional vibration dampers with high-viscosity damping medium.

Yet another object of the invention is to provide new and improved means for filling viscous vibration dampers through the usual filler holes in the damper covers but in a manner which conveys the damping fluid rapidly and with reduced pressure to the housings and covers of the dampers.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a diametrical sectional detail view through a viscous torsional vibration damper embodying features of the invention;

FIG. 2 is a fragmentary sectional elevational detail view taken substantially in the plane of line II—II on FIG. 1;

FIG. 3 is a diametrical sectional view similar to FIG. 1 but showing a modification;

FIG. 4 is a fragmentary similar sectional view showing a further modification;

FIG. 5 is a fragmentary sectional elevational view taken substantially in the plane of line V—V of FIG. 4;

FIG. 6 is a diametrical fragmentary sectional view showing still another modification;

FIG. 7 is a sectional elevational view taken substantially in the plane of line VII—VII of FIG. 6; and FIG. 8 is a diametrical fragmentary sectional view of yet another modification.

The present invention is especially adaptable for viscous torsional vibration dampers of the type which have been found exceptionally useful for damping the vibrations in crankshafts of internal combustion engines. A representative damper 10 of this type is depicted in FIGS. 1 and 2, including a housing 11 of annular form having a central bolt-on flange 12 by which it is adapted to be mounted corotatively on a crankshaft. Within the housing is an annular working chamber 13 containing a complementary annular relatively rotatable member 14 comprising a flywheel or inertia weight 14 having axially facing and circumferential working surfaces in parallel shear film spaced relation to complementary confronting working surfaces of the housing within the chamber 13, the shear film spacings having regard to efficient coupling shear films of viscous fluid in the spaces or gaps provided between the working surfaces. On its inner diameter, the inertia member 14 may be provided with annular bearing rings 15 which maintain the shear film spacing between the housing and inertia member working surfaces and have bearing engagement with the housing axially spaced apart at opposite sides of an annular reservoir 17 desirably provided in the adjacent annular inner wall of the housing. While the housing 11, as shown, may be primarily a one-piece casting with the working chamber 13 cored and machined therein, assembly of the inertia member 14 in the working chamber requires an opening into the chamber, wherefore one side of the working chamber is open in the casting and after the inertia member has been assembled therein is closed by an annular cover 18 which is locked onto outwardly facing shoulders 19 by means of spun-over securing flanges 20 with respective hermetic seals 21 in the joint. Thereby the cover 18 becomes a functionally integral part of the housing and provides one of the axially facing working surfaces in the working chamber 13.

After assembly of the metal components of the damper has been completed, a viscous damping medium such as silicone fluid or oil is loaded into the working chamber 13 to provide an energy absorbing damping coupling between the housing 11 and the inertia ring 14 by resisting relative rotary movements of these elements by the yieldable resistance to shear of the coupling damping medium. Such loading is effected by driving the damping fluid medium under pump pressure into one of a plurality of filling openings 22 while air is displaced from within the working chamber 13 through another of the openings 22. After filling has been completed, the openings 22 are hermetically plugged. Inasmuch as the gaps between the working surfaces of the inertia member and the housing are necessarily limited to the preferred shear film gap spacing, and the confronting bearing surfaces of the housing and the bearings 15 are even closer, without other passageway means the viscous damping fluid would have to find its way into the working face gaps entirely by flowing thereto from the area contiguous to the filling opening through which injected into the working chamber. It will be apparent that only fluid of lower viscosity ratings will lend themselves to such filling under acceptable pump pressures and with reasonable, economical production line speed. Heavier viscosities of the damping fluid which may range up to paste and puttylike consistency present a major problem. While such heavy viscosity materials may be loaded into the working chamber 13 before the inertia member 14 is placed therein by forcing it axially into position, this does not lend itself nearly as well to production line operation involving the sequence already described wherein the inertia member is assembled in the working chamber before filling with damping fluid, the cover 22 is applied and secured, and filling then accomplished through one of the filling openings 22.

According to the present invention, even the heavier viscosity grades of damping medium can be loaded into the damper efficiently and with reasonable production line speed. To this end, passage means are provided leading from the filling opening 22 through the inertia member 14 to convey the damping fluid from the opening 22 into the reservoir 17 with substantial freedom, and the damping fluid readily transferred from the reservoir to the shear film gaps or spaces. In one desirable arrangement, a passage 23 is located in the member 14 to communicate with the reservoir 17 and adapted to convey the damping fluid from the selected opening 22 to the reservoir. In this instance, the passage 23 comprises a bore which desirably extends entirely through from side to side in axial direction and opening through the respective opposite axially facing working surfaces of the member 14. To connect with the reservoir 17, a generally radially extending passage branch 24 extends from the transverse passage bore generally radially inwardly to the reservoir 17. For best results, at least the receiving end of the passage bore 23 nearest the cover 18 is so located on the inertia member 14 as to be disposed in coaxial alignment with the selected filling opening 22 during the filling operation. Further enhancement in relatively unrestricted ease of filling is accomplished by having the passage 23 of substantially larger cross-sectional flow area than the filling opening 22 which should be of as small diameter as may practically be used so as to facilitate effective plugging. On the other hand, since the passage 23 and branch 24, in effect, increase the reservoir capacity within the damper, the passageway system should be maintained within maximum efficiency limits not only to conserve rather costly heavy viscosity damping medium but also to maintain to a reasonable minimum the diminution in working surface area of the damping member. These ends are attained by having the passage 23 on the order of three times the diameter or cross-sectional flow area of the filling opening 22. Enhancement of filling flow to the reservoir 17 is attained by having the branch 24 also of about three times the diameter of the opening 22 and slanting toward the filling opening end of the passage 23.

By having a duplicate of the passage bore 23 and branch 24 for registration with the remaining filling opening 22, serving alternatively as an air exhaust port, filling through either of the openings 22 can be effected with equal efficiency. Transferring of the damping medium fluid from the reservoir 17 by way of the branches 24 and the passages 23 is enhanced by the substantially circumferentially spaced relation of the passages in the inertia member, herein 180°. It will be observed that during filling of the actuator with damping medium the more ready access through the passages branch 24 will cause the reservoir 17 to fill rapidly while the gap spaces between the axially confronting working surfaces of the member will fill more slowly, and after the reservoir 17 has been filled continued filling pressure will be substantially equally effective within the side gaps with which the respective opposite ends of the passages 23 communicate equally. Additionally, in operation, the damping medium fluid can transfer with equal efficiency from the reservoir to the side gap shear film spaces and thence to the outer peripheral shear film gap space. Customarily, filling of the damper is considered complete with a predetermined safety factor shy of absolutely full so as to provide for and compensate for possible expansion not only of the metal parts but of the damping fluid should the damper become heated in operation due to energy dissipation or environmental heating. Centrifugal action will cause the damping fluid to transfer uniformly from the reservoir 17 through the passages 23, 24 bypassing the bearings 15 to the shear film working gaps.

Other representative examples of passages through the inertia member 14 to attain the desirable results of filling of the reservoir and distribution of the damping medium are shown in FIGS. 3 to 8. In each instance free, efficient filling passage from the filling opening to the reservoirs and transfer from the reservoir to the working gaps spaces is provided for.

In FIG. 3, the inertia member 14 has respective slots 25, which may be milled therein and located to communicate at one end with the selected filling opening 22 and at the opposite end with the reservoir 17, and bypassing the adjacent bearing ring 15. Distribution communication between the slot 25 and the opposite side of the inertia member 14 is effected by way of a bore 27 in each instance.

As shown in FIGS. 4 and 5, communication through the inertia member 14 and between the filling opening 22 and the reservoir 17 is effected through a passage 28 extending diagonally from alignment at its outer end with the filling opening to an inner end communicating with the reservoir and bypassing the adjacent bearing ring 15. To bypass the other bearing ring 15 and to effect transfer communication between the reservoir 17 and the remaining side working gap, a divergently oblique passage 29 connects with the inner end of the passage 28 and with the reservoir 17 and opens through the working surface of the member 14 at the opposite side from the filling opening 22.

As shown in FIGS. 6 and 7, substantially unrestricted communication between the selected filling opening 22 and the reservoir 17 is effected by way of a passage provided by a milled slot 30 in the inertia member 14 bypassing the adjacent bearing ring 15. Fluid transferring communication between the reservoir 17 and the opposite face of the inertia member 14 bypassing the remaining bearing ring 15 is effected by way of a milled slot 31. For enhancing the damping medium fluid distribution, respective opposite axially facing working surfaces of the inertia member 14 may be provided with respective radially extending grooves 32 communicating at their radially inner ends with the respective slots 30 and 31 and being interconnected across the perimeter of the inertial member by a similar groove 33. This enhances transfer of hydraulic fluid from the reservoir 17 to the working surfaces both axial and peripheral and assures wetting the entire areas of the confronting working surfaces.

FIG. 8 represents an arrangement much the same as in FIG. 1 except that the bearings 15 are eliminated. In such arrangement, the method and structure of the present invention are especially significant because the incoming pressure during loading of the damper with damping fluid tends to force the inertia member 14 toward the opposite side of the housing and this might result in dry areas between the working surfaces at that side and erratic performance of the damper. By virtue of the fluid transfer communication afforded by the passage 23 and the branch 24, any such condition is promptly alleviated during operation, if not entirely avoided during filling.

It will be understood that variations and modifications may be effected without departing from the spirit and scope of the novel concepts of this invention.

I claim as my invention:

1. A torsional vibration damper including an annular member relatively rotatably mounted within a working chamber in a housing which provides working surfaces parallel in shear film gap spaced relation to confronting working surfaces of the member, with an annular reservoir between said member and said housing communicating with the shear film spaces between said surfaces, and the housing having a filling opening, the improvement comprising:

a relatively unrestricted passage in said member located to communicate with said reservoir and adapted for alignment with said opening to convey damping fluid from said opening to said reservoir; whereby damping fluid filled into the chamber through said opening will be conveyed to said reservoir for transfer from the reservoir into shear films of the fluid in said spaces.

2. A damper according to claim 1, in which said passage comprises a slot in an axially facing working surface of said annular member.

3. A damper according to claim 2, comprising a second slot effecting communication between said reservoir and a shear film space area other than a shear film space area in communication with the first-mentioned passage slot.

4. A damper according to claim 1 in which said opening is in one axially facing side of the housing, said reservoir is located at an inner perimeter of said annular member, said annular member having opposite axially facing sides, and said passage comprises angularly related portions communicating with said reservoir and opening through said opposite sides of said annular member.

5. A damper according to claim 1, including fluid distribution grooves in the working surfaces of the annular member communicating with said passage.

6. A damper according to claim 1, including a plurality of filling openings into the housing alternatively usable for filling and for air displacement from within the housing during filling, and a plurality of said passages respectively alignable with the said openings to receive fluid directly therefrom.

7. A damper according to claim 1, sad annular member having an inner perimeter and an axially facing working surface, said housing having an axially facing working surface facing said annular member surface and said passage being through said annular member working surface and bypassing said bearing ring means.

8. A torsional vibration damper including an annular member relatively rotatably mounted within a working chamber in a housing which provides working surfaces parallel in shear film gap spaced relation to confronting working surfaces of the member, with an annular reservoir between said member and said housing communicating with the shear film spaces between said surfaces, and the housing having a filling opening, the improvement comprising:
 a relatively unrestricted passage in said member located to communicate with said reservoir and adapted to convey damping fluid from said opening to said reservoir;
 said passage comprising a main passage extending from side to side through the annular member; and
 a branch passage connecting said main passage with the reservoir; whereby damping fluid filled into the chamber through said opening will be conveyed to said reservoir for transfer from the reservoir into shear films of the fluid in said spaces.

9. A torsional vibration damper including an annular member relatively rotatably mounted within a working chamber in a housing which provides working surfaces parallel in shear film gap spaced relation to confronting working surfaces of the member, with an annular reservoir between said member and said housing communicating with the shear film spaces between said surfaces, and the housing having a filling opening, the improvement comprising:
 a relatively unrestricted passage in said member located to communicate with said reservoir and adapted to convey damping fluid from said opening to said reservoir;
 said passage at least in part extending diagonally from said filling opening to the reservoir; wherein damping fluid filled into the chamber through said opening will be conveyed to said reservoir for transfer from the reservoir into shear films of the fluid in said spaces.

10. A torsional vibration damper including an annular member relatively rotatably mounted within a working chamber in a housing which provides working surfaces parallel in shear film gap spaced relation to confronting working surfaces of the member, with an annular reservoir between said member and said housing communicating with the shear film spaces between said surfaces, and the housing having a filling opening, the improvement comprising:
 a relatively unrestricted passage in said member located to communicate with said reservoir and adapted to convey damping fluid from said opening to said reservoir;
 said passage including a slot in said annular member and a bore through said member communicating with said slot; whereby damping fluid filled into the chamber through said opening will be conveyed to said reservoir for transfer from the reservoir into shear films of the fluid in said spaces.

* * * * *